(12) United States Patent
Braun et al.

(10) Patent No.: US 7,700,907 B2
(45) Date of Patent: Apr. 20, 2010

(54) DEVICE FOR DETERMINING THE ANGULAR POSITION OF A ROTATABLE COMPRESSOR STATOR BLADE

(75) Inventors: Joachim Braun, Mülheim an der Ruhr (DE); Walter Loch, Mülheim an der Ruhr (DE); Bernd Pollack, Essen (DE); Vadim Shevchenko, Dortmund (DE); Joachim Simmchen, Bergisch Gladbach (DE)

(73) Assignee: Siemens Aktiengesellschaft, Munich (DE)

( * ) Notice: Subject to any disclaimer, the term of this patent is extended or adjusted under 35 U.S.C. 154(b) by 137 days.

(21) Appl. No.: 11/895,929

(22) Filed: Aug. 28, 2007

(65) Prior Publication Data
US 2009/0021247 A1 Jan. 22, 2009

(30) Foreign Application Priority Data
Aug. 28, 2006 (EP) .................................. 06017926

(51) Int. Cl.
*G01D 5/34* (2006.01)
(52) U.S. Cl. ..................... 250/231.13; 73/1.28; 356/617
(58) Field of Classification Search .................................
250/231.13–231.18, 237 G, 237 R; 341/11,
341/13, 31; 356/616–619; 359/436–442;
73/1.27, 1.28
See application file for complete search history.

(56) References Cited

U.S. PATENT DOCUMENTS

| 7,034,282 B2 * | 4/2006 | Oka et al. ............... 250/231.13 |
| 2003/0007752 A1* | 1/2003 | Oka et al. ...................... 385/92 |
| 2004/0074093 A1* | 4/2004 | McCarvill et al. ....... 29/888.021 |

FOREIGN PATENT DOCUMENTS

DE 103 22 703 A1 12/2003
JP 2005181023 A 7/2005

* cited by examiner

*Primary Examiner*—Georgia Y Epps
*Assistant Examiner*—Francis M Legasse, Jr.

(57) ABSTRACT

The invention refers to a device for determining the angular position of a compressor stator blade, which is rotatable around its longitudinal axis and arranged in a compressor, with which is associated a measuring surface which rotates synchronously with it. For a reliable, simple and approximately error-free recording of the angular positions, the angular position of the compressor stator blade can be determined via the device in an automated manner. For this purpose, it has at least one mounting unit provided for aligned fastening of the device on the compressor, and at least one measuring and evaluating unit which comprises at least two distance sensors which each record a distance to the measuring surface which is rotatable from the reference position, as a result the angular position of the measuring surface, relative to the reference position depends upon the two recorded distances, is determined by the measuring and evaluating unit.

14 Claims, 2 Drawing Sheets

DEVICE FOR DETERMINING THE ANGULAR POSITION OF A ROTATABLE COMPRESSOR STATOR BLADE

CROSS REFERENCE TO RELATED APPLICATIONS

This application claims priority of European application No. 06017926 filed Aug. 28, 2006, which is incorporated by reference herein in its entirety.

FIELD OF INVENTION

The invention refers to a device for determining the angular position of a compressor stator blade, which is rotatable around its longitudinal axis and arranged in a compressor, and with which is associated a measuring surface which rotates synchronously with it.

BACKGROUND OF INVENTION

It is known that in the assembly of compressor stator blades, which are adjustable around their longitudinal axis, and in the associated adjusting drive, these are individually aligned, by means of a device, with a reference slot which is arranged on the stator blade carrier. This is necessary so that all the blade airfoils of the compressor stator blade ring always have identical stagger angles in order to ensure a synchronous incident flow of the subsequent compressor rotor blades during operation. An asynchronous incident flow of the compressor rotor blades could lead to a vibration excitation of individual blade airfoils of the rotor blades. In unfavorable cases, this could have an effect on the rotor blades in a damaging way. In order to avoid this unwanted and potentially critical operating situation of the compressor, a check of the assembly quality by means of a conclusive measuring of the angular position of all the adjustable stator blades is necessary before putting the compressor into operation.

Up to now, the angular position of stator blades was measured by means of a universal angle gage and an auxiliary device. The auxiliary device, which was located upon the reference slot on the stator blade carrier, served as a stop for the one measuring arm of the angle gage. The rear side face of an adjusting lever, which is arranged on the rotatable compressor stator blade, served as a stop face for the second measuring arm of the angle gage, upon which the angular position of the stator blade could then be read. Contingent upon the constricted space conditions on the compressor, and depending upon the position of the compressor stator blade to be checked on the circumference, reading errors and inaccurately located measuring arms could result. This could especially be the case if the fitter has to work overhead. As a result of the erroneous inspection, it could be possible that correctly set stator blades were unnecessarily adjusted into an incorrect position, or incorrect positions of compressor stator blades were not recognized. This could altogether lead in part to unevenly set stagger angles, as seen over the circumference, of the blade airfoils of rotatable stator blades. A further source of error, which can lead to a slightly asymmetric setting of the compressor stator blades, are the tolerances by using the auxiliary device.

SUMMARY OF INVENTION

The object of the present invention, therefore, is the provision of a device for determining the angular position of a compressor stator blade, which is rotatable around its longitudinal axis and arranged in a compressor, in which reading errors can be avoided and measurement tolerances can be further reduced.

The object is achieved by means of a device which is formed according to the features of the claims. The device comprises a mounting unit which is provided for fastening the device on the compressor or on its stator blade carrier. Furthermore, the device comprises a measuring and evaluating unit which comprises at least two distance sensors which can record in each case a distance to the measuring surface which is rotatable from a reference position, as a result of which the angular position of the measuring surface with regard to its reference position in dependence upon the two recorded distances is determinable by the evaluating unit.

The invention starts from the knowledge that reading errors are avoided as long as the measuring of the rotational angle, or of the angular position, of the compressor stator blade can be carried out in an automated way. After activating the device, two distance sensors measure in each case a distance to the measuring surface which represents the stagger angle of the blade airfoils of the compressor stator blades. Based on the measuring surface, which is pivotable around the longitudinal axis, two different distances are determined in dependence upon their angular position. From the difference of the two distances, and taking into account the distance between the two distance sensors to each other, the actual angular position can be determined by using trigonometric functions.

Due to the automated recording of values by means of the device, mechanical inaccuracies, like, for example, inaccurately located measuring arms on the auxiliary device or on the adjusting lever, as the case may be, being able to influence the measuring result, is avoided. Moreover, by the proposed measuring device, the measuring accuracy can be significantly increased, achieved on the basis of the tolerances of the universal angle gage.

Contingent upon the automatic recording of two distances and their linking to a difference, moreover, the calibrating of the two distance sensors is dispensed with. An adjustment of the two distance sensors, however, is still necessary, wherein it only has to be ensured that with an actually existing identical distance between respective distance sensor and associated measuring point on the measuring surface, these also actually record an identical distance.

Advantageous developments are disclosed in the dependent claims.

The distance sensors are preferably formed as commercially available laser distance sensors. Since, therefore, the measuring arms of an angle gage are dispensed with, these can neither be inaccurately located on the locating surfaces, as a result of which a possible cause of errors has been eliminated. The laser distance sensors, for example, function according to the principle of triangulation.

In an especially preferred development of the invention, the distance sensors, and, if applicable, the deflection unit, are arranged in relation to each other in such a way that each beam which is recordable by the distance sensors is reflected in each case at a measuring point which is arranged on the measuring surface. A fictitious straight line, which connects the two measuring points, is extended in this case transversely, preferably perpendicularly, to the longitudinal axis. This enables the device not having to be accurately aligned along the circumference, and, therefore, also in relation to the longitudinal axis. Or, in other words: regardless of its position along the circumference, the device can always determine the same angular position of the measuring surface as a result of this feature.

In order to disclose a device for determining the angular position of compressor stator blades, which is especially compact and adapted to the constricted space conditions of a compressor, the beams which are emittable by the distance sensors, are deflectable onto the measuring surface via at least one deflection unit. By the same token, the beams which are reflected from the measuring surface at the measuring point can be fed back to the distance sensors via this deflection unit, so that these can accurately record the respective distance, based on the propagation time signal of the beams.

Consequently, before using the device, it is to be adjusted so that the distance sensors, with an identical distance to the measuring surface of this, also actually records an identical distance.

For the especially simple and temporary fastening of the device on a compressor, the mounting unit of the device has a plurality of magnets, especially a plurality of permanent magnets. By means of permanent magnets, the mounting unit can be especially simply temporarily fastened on the compressor, and removed again after measuring has been carried out. Also, the use of magnets enables operation of the device by only one operator.

In order to accurately position the device in relation to the compressor and to exclude an incorrect recording of the angular position on account of a device which is fastened in a twisted manner in relation to the reference position, this is fastenable, by means of two projections, in an aligned manner in relation to a reference element which is arranged on the compressor. The reference element in this case is preferably formed as a circumferential groove, in which projections, as tongue elements of a groove and tongue connection, i.e. positive locking, which are provided on the mounting unit, are insertable. A device which is seated in a twisted manner in relation to the reference position can therefore be avoided. A spring-mounted ball is preferably provided in each projection and can slightly protrude from one side wall of the projection. Each ball is supported on one of the two side walls of the circumferential groove and as a result presses the surface of the projection which lies opposite it onto the other of the two side walls of the circumferential groove, as a result of which an accurate position of the device is achieved.

In order to enable an especially simple determining of the angular position of a rotatable compressor stator blade, the reference position is that position of the measuring surface, which is rotatable around the longitudinal axis, in which this is perpendicular to the machine axis. The device, which is correctly aligned in relation to this reference position, records an identical distance when the measuring surface is located in the reference position.

The angular position, which is determinable by the evaluating unit, is preferably digitally displayed by a display unit. In this case, the display unit displays an angular position of 0°, if the measuring surface is located in the reference position.

In order to hold ready the determined angular positions in a reusable manner for statistical researches and documentation purposes, these, for example, can be stored in a buffer storage of the device, or in a databank. The stored angular positions, moreover, can be read out from the device via commercially available interfaces.

Consequently, by using the mobile device without moving parts, measuring tolerances on guides and incorrect handling of measuring arms can be avoided. Furthermore, the pressure pieces enable an accurate reproducible alignment of the device on the compressor or on the stator blade carrier, as the case may be, wherein the magnets facilitate handling and enable operation of the device by only one fitter. Reading errors can be excluded by means of comparatively large digital displays of the measuring result.

BRIEF DESCRIPTION OF THE DRAWINGS

The invention is explained with reference to four figures. In the drawing.

DETAILED DESCRIPTION OF INVENTION

Figure 1:
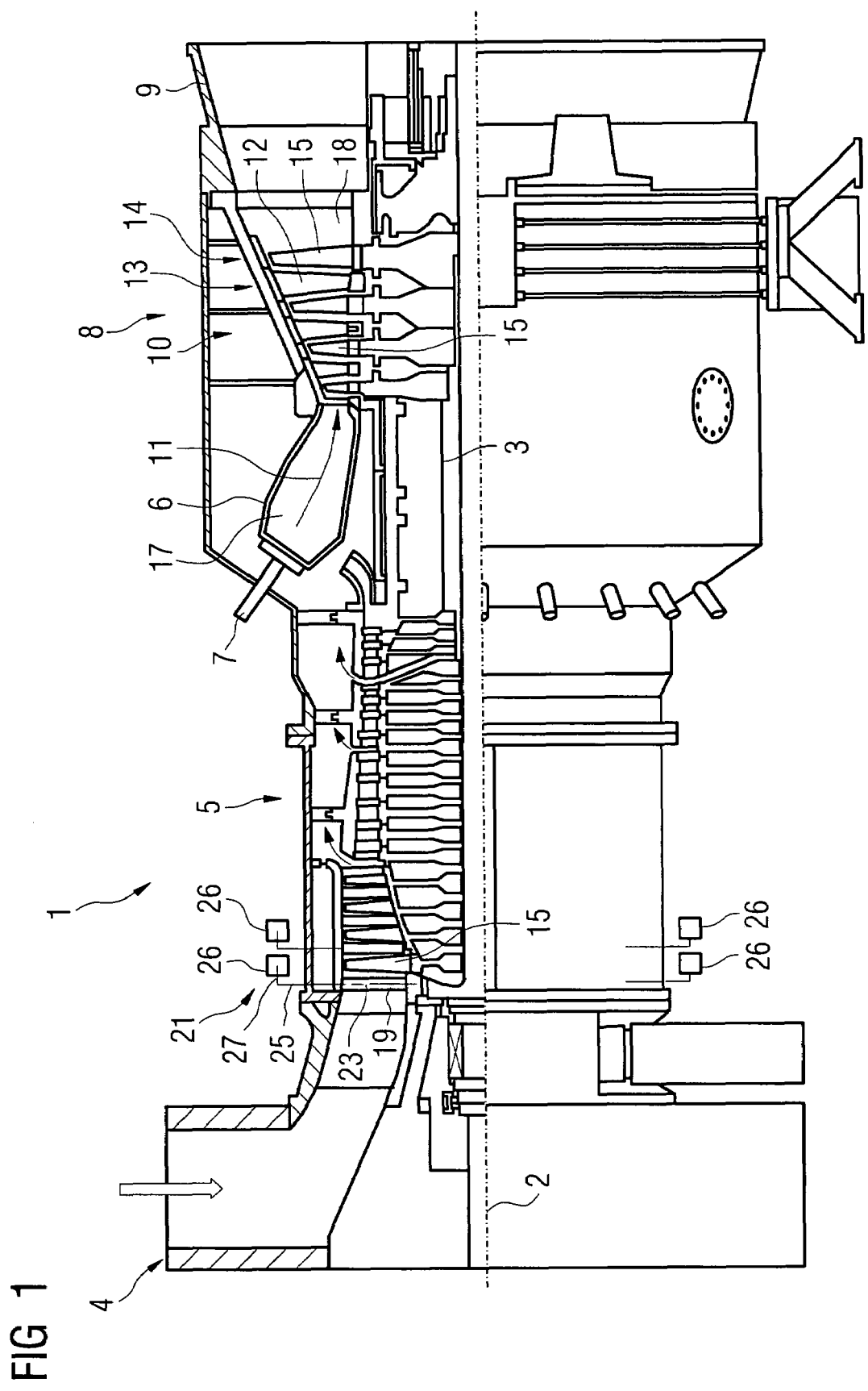
FIG. 1 shows a gas turbine in a longitudinal partial section.

FIG. 1 shows a turbomachine, which is formed as a gas turbine 1, in a longitudinal partial section. Inside, it has a rotor 3, which is also referred to as a turbine rotor, which is rotatably mounted around a machine axis 2. In series along the rotor 3, there is an intake casing 4, a compressor 5, a toroidal annular combustion chamber 6 with a plurality of burners 7 which are arranged axially symmetrically in relation to each other, a turbine unit 8, and an exhaust casing 9. The annular combustion chamber 6 forms a combustion space 17 which communicates with an annular hot gas passage 18. There, four turbine stages 10, which are connected one behind the other, form the turbine unit 8. Each turbine stage 10 is formed from two blade rings. As seen in the flow direction of a hot gas 11 which is produced in the annular combustion chamber 6, a row 14 which is formed from rotor blades 15 follows a stator blade row 13 in the hot gas passage 18 in each case. The stator blades 12 are fastened on the stator, whereas the rotor blades 15 of a row 14 are attached on the rotor 3 by means of a turbine disc. A generator or a driven machine (not shown) is coupled to the rotor 3.

Adjustable compressor stator blades 19 are provided at the inlet of the compressor 5 on the intake casing side. The compressor stator blades 19 are radially arranged in the annular flow passage of the compressor 5 and can be rotated around their respective longitudinal axis 23 by a drive device 21 in order to adjust, for example, the mass flow which flows through the gas turbine 1. Depending upon the angle of incidence, which is also called stagger angle, an especially large or a small mass flow can flow through the gas turbine 1 according to requirement. In order to reduce flow losses in the inducted ambient air, and to prevent a vibration excitation of rotor blades 15, which rotate directly downstream of the compressor stator blade 19, which vibration excitation takes place in the case of an uneven incident flow of the rotor blades 15, as seen over the circumference, all the compressor stator blades 19 are synchronously adjusted, constantly maintaining equal angles of incidence by means of the drive device 21.

The drive device 21 is provided outside the flow passage, and, in addition to adjusting levers 27 which are associated in each case with a compressor stator blade 19, comprises an adjusting ring 26 which simultaneously operates all the adjusting levers 27 and encompasses the compressor 5 in a ring-like fashion.

Figure 2:
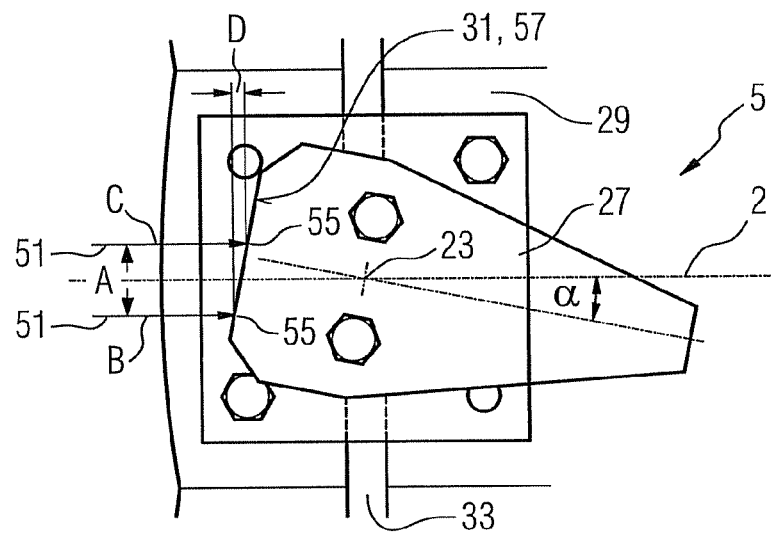
FIG. 2 shows the plan view of a compressor stator blade carrier with an adjusting lever.

FIG. 2 shows the radial plan view, with regard to the machine axis 2, of an adjusting lever 27 for the compressor blade 19 which is also referred to as an adjustable compressor inlet guide vane. The compressor casing 29 or the compressor stator blade carrier is provided between the adjusting lever 27 and the blade airfoil of the compressor blade 19. The blade airfoil of the compressor blade 19 and also the adjusting lever 27 are rigidly interconnected and so both are synchronously rotatable around their common longitudinal axis 23.

Figure 3:
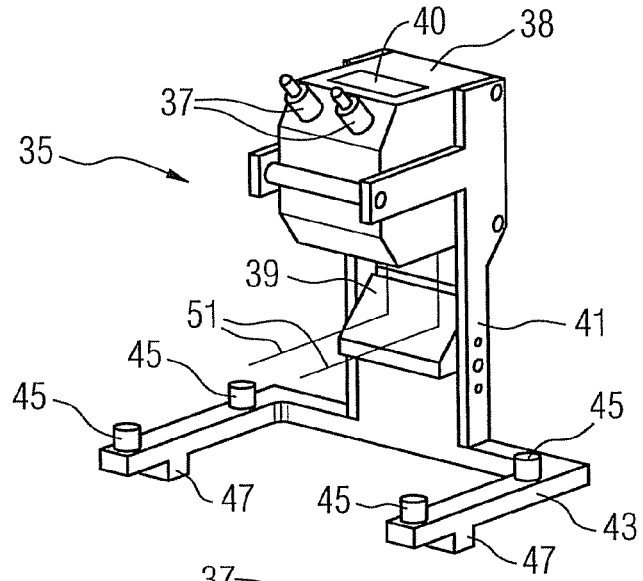
FIG. 3 shows the device for determining the angular position of the compressor stator blade which is rotatable around its longitudinal axis, in a perspective view.

For determining the angular position of the compressor stator blades 19, which are rotatable around their longitudinal axis 23 and arranged in the compressor 5, a measuring surface 31 is provided on the adjusting lever 27 and is synchronously rotated with the compressor stator blade 19 and consequently with its blade airfoil. In order to determine the angular position of the measuring surface 31, which is parallel to the longitudinal axis 23, in relation to a reference position, the device 35 which is shown in FIG. 3 is provided. The reference position of the measuring surface 31 is that of the positions which are occupiable by the measuring surface 31 in which this is perpendicular to the machine axis 2.

The device 35 comprises at least two distance sensors 37 which are preferably formed as laser distance sensors. Furthermore, the device 35 comprises a deflection unit 39, which is formed as a mirror 39, which is fastened rigidly, but adjustably in its inclination, on the mounting unit 41 of the device 35. The mounting unit 41 additionally comprises a U-shaped support base 43 upon which a plurality of permanent magnets 45 are provided for fastening the device 35 on the compressor 5. Furthermore, two projections 47 are provided on the support base 43 and are insertable in an encompassing circumferential groove 33 (FIG. 2) which is provided on the compressor stator blade carrier 29. In order to exclude a twisted seating of the device 35 in relation to the compressor 5 or reference position, as the case may be, moreover, spring-mounted, slightly projecting balls are fitted in each case in the projections and can be supported upon a side wall of the circumferential groove.

Figure 4:
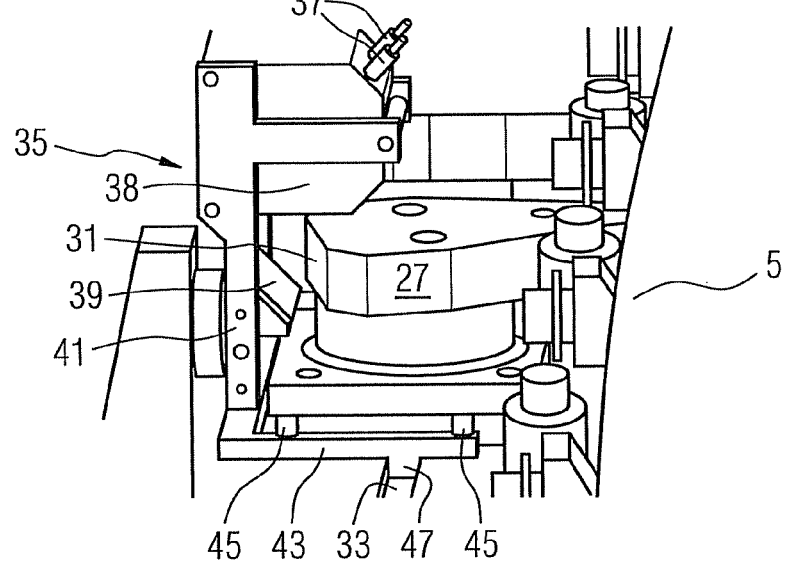
FIG. 4 shows the installed situation of the device for determining the angular position on the compressor of the gas turbine.

FIG. 4 shows the device 35 fastened on the compressor 5 in its operating position ready for measuring the angular position of the compressor stator blade 19.

Determining of the angular position of the compressor stator blade 19 with regard to the reference position is explained with reference to FIG. 2. The visible beams 51 which are transmittable by the two distance sensors 37 are projected via the deflection unit 39 onto the measuring surface 31, upon which a measuring point 55 is then reflected in each case. The light which is reflected from each measuring point 55 is displayed via the deflection unit 39, and via an optical receiving device which is integrated in each case in the sensor, on a position-sensitive element, from which the distance sensor 37 can determine the respective distance B, C between it and the measuring surface 31 by means of the triangulation principle. A fictitious straight line 57, which connects the measuring points 55 which are reflected on the surface of the adjusting lever 37, extends perpendicularly to the longitudinal axis 23.

As long as the measuring surface 31 of the adjusting lever 27 is located in the reference position, the two distance sensors 37 record in each case a distance B, C of equal size. On account of the measuring surface 31, which is shown in FIG. 2 and rotated from its reference position, and on account of the correspondingly synchronously rotated compressor stator blade 19, the two distance sensors 37 record in each case distances B, C of different size. The difference D between the two recordable distances B, C in this case is larger the further the measuring surface 31 is rotated from its reference position.

The two distance sensors 37 are arranged in such a way that their beams 51 extend parallel to each other with a predetermined spacing A. On account of the spacing A of the two parallel beams 51 which is stored in the measuring and evaluating unit 38, and on account of the further determined difference D, the angle α, which represents the angular position of the compressor stator blade 19 with regard to its reference position, can be determined by the measuring and evaluating unit 38 by means of known trigonometric functions.

As long as the measuring surface 31 of the adjusting lever 27 is located in the reference position, a display unit 40 on the device 35, which is not shown further, digitally displays the angular position of 0°. A rotation of the adjusting lever 27 in the clockwise direction, for example, is indicated with a positive angle, whereas a rotation of the compressor stator blade 19 in the anti-clockwise direction is displayed with a negative sign.

Furthermore, the device 35 can also comprise further means by which the angular positions which are determinable by it are storable and from which the stored angular positions are readable, so that these can be further processed for statistical calculations.

In all, by the device 35 for determining the angular position of a compressor stator blade 19, which is rotatable around its longitudinal axis 23 and arranged in a compressor 5, and with which is associated a measuring surface 31 which rotates synchronously with it, an especially reliable, simple and also error-free recording of angular positions can be carried out. The angular position of the compressor stator blade 19, which is rotatable around its longitudinal axis, can be exceptionally accurately and reproducibly determined.

For this purpose, the device 35 has at least one mounting unit 41, which is provided for aligned fastening of the device 35 on the compressor 5, and at least one measuring and evaluating unit 38 which comprises at least two distance sensors 37 which record in each case a distance B, C to the measuring surface 31 which is rotatable from the reference position, as a result of which the angular position of the measuring surface 31 with regard to its reference position in dependence upon the two recorded distances B, C is determinable by the measuring and evaluating unit 38.

The invention claimed is:

1. A device for determining the angular position of a compressor stator blade, which is rotatably adjustable about a longitudinal axis and arranged in a compressor of a turbomachine, the device comprising:
    a measuring surface that adjusts synchronously with the rotatable adjustment of the stator blade around the longitudinal axis, the longitudinal axis being perpendicular to a machine axis of a rotor of the turbomachine, wherein the measuring surface is rotatably adjustable from a reference position relative to the longitudinal axis;
    a mounting unit for fastening the device on the compressor; and
    a measuring and evaluating unit having a plurality of distance sensors that each transmit a beam and record a distance to the measuring surface,
    wherein the angular position of the measuring surface with regard to the reference position is determined by the measuring and evaluating unit based on the plurality of recorded distances.

2. The device as claimed in claim 1, wherein the distance sensors are laser distance sensors.

3. The device as claimed in claim 1, wherein the reference position of the measuring surface is a position where the measuring surface is perpendicular to the machine axis.

4. The device as claimed in claim 1, wherein the measuring surface is planar.

5. The device as claimed in claim 1, wherein when the measuring surface is located in the reference position the sensors are equal distance from the measuring surface.

6. The device as claimed in claim 1, wherein the measuring surface is parallel to the longitudinal axis in relation to the reference position.

7. The device as claimed in claim 1, wherein the transmitted beams are parallel with a predetermined spacing.

8. The device as claimed in claim 2, wherein the beams transmitted by the distance sensors are deflected onto the measuring surface via a deflection unit.

9. The device as claimed in claim 8, wherein the distance sensors and the deflection unit are arranged such that each beam recorded by the distance sensors is reflected at a point arranged on the measuring surface, and a fictitious straight line that connects the two points extends transversely to the longitudinal axis.

10. The device as claimed in claim 9, wherein the straight line extends perpendicularly to the longitudinal axis.

11. The device as claimed in claim 10, wherein the mounting unit comprises a plurality of permanent magnets.

12. The device as claimed in claim 3, further comprising a display unit for displaying the angular position determined by the evaluating unit.

13. The device as claimed in claim 1, wherein the display unit displays an angular position of 0° when the measuring surface is located in the reference position.

14. The device as claimed in claim 13, wherein the determinable angular positions are stored, and the stored angular positions are readable.

* * * * *